(12) United States Patent
Benesi

(10) Patent No.: US 7,674,386 B2
(45) Date of Patent: Mar. 9, 2010

(54) SLURRY FILTRATION SYSTEM AND APPARATUS

(75) Inventor: Steve C. Benesi, Novato, CA (US)

(73) Assignee: FLSmidth A/S, Valby (DK)

( * ) Notice: Subject to any disclaimer, the term of this patent is extended or adjusted under 35 U.S.C. 154(b) by 962 days.

(21) Appl. No.: 10/575,820

(22) PCT Filed: Jun. 12, 2004

(86) PCT No.: PCT/US2004/018644

§ 371 (c)(1),
(2), (4) Date: Apr. 13, 2006

(87) PCT Pub. No.: WO2005/007270

PCT Pub. Date: Jan. 27, 2005

(65) Prior Publication Data

US 2006/0283785 A1    Dec. 21, 2006

Related U.S. Application Data

(60) Provisional application No. 60/478,791, filed on Jun. 16, 2003.

(51) Int. Cl.
B01D 17/12 (2006.01)
B01D 37/00 (2006.01)

(52) U.S. Cl. ............. 210/741; 100/45; 100/48; 100/73; 100/99; 210/85; 210/90; 210/96.1; 210/103; 210/134; 210/141; 210/143; 210/149; 210/210; 210/227; 210/231; 210/399; 210/400; 210/401; 210/742; 210/743; 210/771; 210/177

(58) Field of Classification Search ............ 210/85, 210/87, 90, 96.1, 96.2, 141, 143, 149, 177, 210/184, 186, 194, 198.1, 205, 209, 210, 210/212, 216, 359, 387, 391, 398, 399, 407, 210/409, 410, 702, 737, 738, 739, 741, 742, 210/769–774, 805, 806, 808, 225–231, 709, 210/743, 103, 134; 100/45, 48, 71, 73, 74, 100/99, 104, 110–112, 116, 118, 120, 126, 100/193–199
See application file for complete search history.

(56) References Cited

U.S. PATENT DOCUMENTS 3,393,149 A * 7/1968 Conley et al. ............ 210/709

(Continued)

FOREIGN PATENT DOCUMENTS

JP   03 042006 A   2/1991

(Continued)

*Primary Examiner*—Joseph W Drodge
(74) *Attorney, Agent, or Firm*—Aaron M. Pile; Daniel DeJoseph; George W. Wasson

(57) ABSTRACT

A slurry filtration system and apparatus with peripheral elements for conditioning a slurry prior to entry into a pressure filter (32) and the control of fluid and liquid introductions into the filter (32) to produce a desired filter cake or filtrate. The system includes a controller (16) for controlling the operation of the peripheral treatment for the introduction of coagulants, flocculants and polymers to treat or condition a slurry introduced into the filter (32) and the control of additional peripheral equipment for treatment of the slurry with liquid clearing or cake forming gas, steam, or drying or conditioning gas within the filter chamber (40) for the production of both filtrate and filter cake from the filter (32) to a form desired.

20 Claims, 3 Drawing Sheets

U.S. PATENT DOCUMENTS

| | | | | |
|---|---|---|---|---|
| 5,382,356 A | * | 1/1995 | Thogho et al. | 210/96.1 |
| 5,462,677 A | * | 10/1995 | Benesi | 210/791 |
| 5,510,025 A | * | 4/1996 | Benesi | 210/227 |
| 5,558,773 A | * | 9/1996 | Aigeldinger et al. | 210/770 |
| 6,159,359 A | * | 12/2000 | Benesi | 210/87 |
| 6,521,135 B1 | * | 2/2003 | Benesi | 210/771 |

FOREIGN PATENT DOCUMENTS

| WO | WO 98/05402 A | 2/1998 |
|---|---|---|

* cited by examiner

SLURRY FILTRATION SYSTEM AND APPARATUS

This application claims priority of U.S. Provisional Application No. 60/478,791, filed Jun. 16, 2003

This invention relates to slurry filtration apparatus and systems for operating such apparatus, more particularly to the combination of filter apparatus and peripheral equipment for analyzing characteristics of a slurry, the pretreatment of the slurry prior to entry into the filtration chamber, the treatment of the slurry during residence within the filtration chamber, and the removal of separated liquids and solids from the slurry during operation of the filtration apparatus.

Slurries of solids and liquids produced in many manufacturing processes require separation of the liquids and solids to produce a desired product or products; the product may be either or both the liquid or the solid part of the slurry. Efficiency in accomplishing the separation and the quality of the separated liquid or solid with the least amount of equipment is the objective of many separating systems. Efficiency in the separation system is dependent upon the time taken to accomplish the separation as well as the amount of utilities and space needed for the system and the need for multiple pieces of equipment to accomplish the separation and quality of separated product The present invention is directed to a system and apparatus for efficiently separating liquids from solids in a slurry stream with a minimum of equipment and with the use of a limited amount of space and utilities while producing the desired end product of a liquid and/or solid product.

Prior art separating systems have used centrifugal mechanisms for separating liquids and solids followed by rotary, flash, fluid bed, or belt dryers for producing a product. Others have used diaphragm membrane filters that press liquids from solids followed by drying processes for drying the solids. Other filters of the design of the present inventor use a pressure filter that includes a filter chamber that distributes a slurry within the chamber and follows the filling with liquid or fluid introductions to the chamber to force the separation of the liquids from the chamber to leave a solids filter cake of a desired form.

The present invention is a system using the filter apparatus previously disclosed by the present inventor along with peripheral elements for conditioning the slurry prior to entry into the filter apparatus and the control of fluid and liquid introduction into the filter apparatus to produce a product of desired quality. The system includes a controller for controlling the operation of the peripheral equipment, for the introduction of the treated or conditioned slurry into the filter apparatus, and the control of additional peripheral equipment for treatment of the slurry within the chamber for the production of both desired liquids and solids from the filter apparatus in a form desired for the process involved.

DETAILED DESCRIPTION OF THE DRAWINGS

Figure 1:
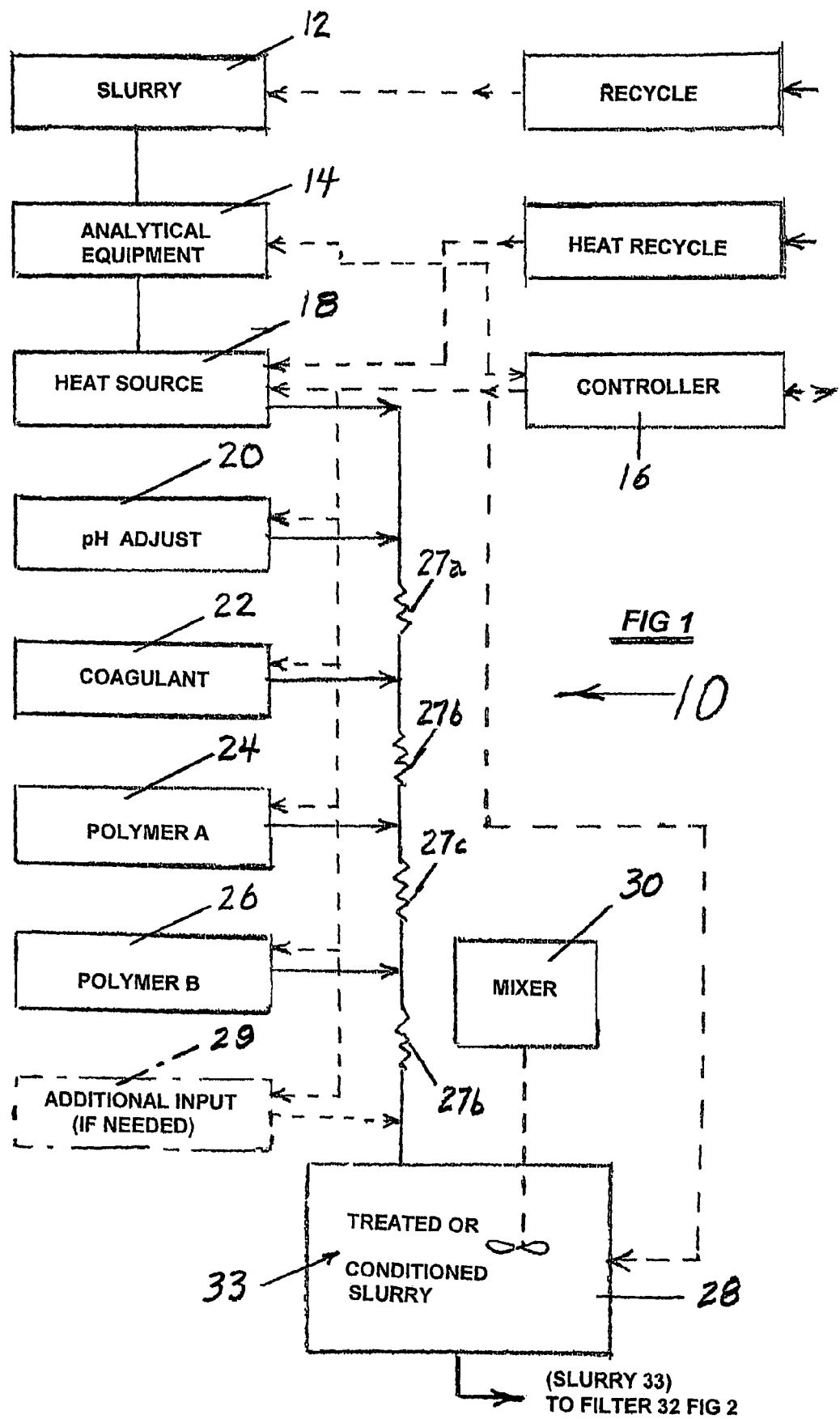
FIG. 1 is a block diagram illustration of a portion of the apparatus showing elements of the system, for pretreatment of a slurry stream, and the interconnection of those elements and the relationship of those elements with the elements of FIG. 2.
Figure 2:
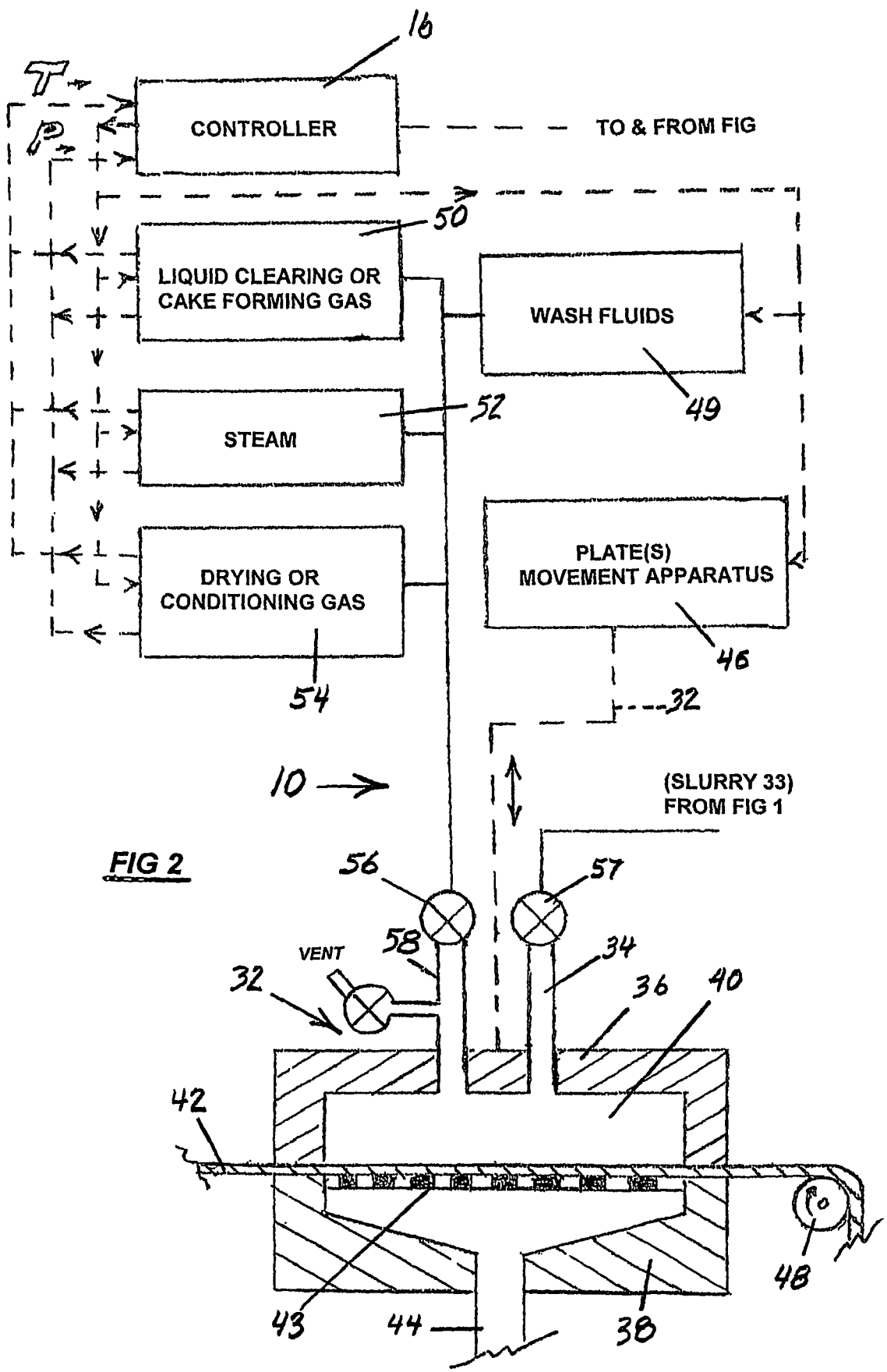
FIG. 2 is a block diagram illustration of additional portions of the apparatus showing the elements of the system for operation of the filter apparatus during a filtration process and the relationship of those elements with the elements of FIG. 1.

The attached FIGS. 1 & 2 illustrate an overall system 10 in block diagram form; the system of the present invention may include a filter apparatus and the peripheral apparatus used to perform the method of the system. All or selected parts of the peripheral apparatus may be used in accord with the present invention. FIG. 1 illustrates an input slurry stream at 12 followed by analytical equipment14 for measuring selected characteristics of the slurry stream. In a typical slurry stream filtration application, an initial pre-analysis or process engineering evaluation may have determined the selected characteristics; however, in some applications variations in those characteristics may occur. In such an application, the analytical equipment may be used to provide continuing analytical data. The results of the analysis of the characteristics, or pre-analysis, of the slurry stream are passed to a controller 16 where a central control of several peripheral pieces of equipment are to be controlled. The slurry stream may then be passed to a heat source 18 where the temperature of the slurry is maintained and/or controlled in accord with a preprogrammed specification for the system. The heat source 18 may not be needed in all applications. The slurry then passes to a pH measuring and adjusting apparatus 20 where that characteristic of the slurry is measured and adjusted in a known manner, if needed, under control of the controller 16. For purposes that will be later discussed, the slurry stream is them combined with coagulants from coagulant source 22, polymers from polymer source A 24 and/or from polymer source B 26 or from additional sources of additives 29 as needed. A simplified version may only require a single additive (such as a coagulant, a flocculent or a polymer) introduction upstream of the filter. The slurry stream with mixed additives may then be passed to a slurry conditioning stage 28 including a mixer 30 for preparing the slurry for feed to a filter apparatus 32, as shown in FIG. 2.

The filter apparatus and its peripheral equipment of the system 10 is further illustrated in block diagram FIG. 2. The filter apparatus 32 includes a slurry input port 34, an upper plate 36 having an internal cavity, a lower plate 38 having an internal cavity that together form a filter chamber 40 by mating of the plates and their internal cavities, and a filter media 42, between the upper and lower plates. The filter media is a porous filter belt that is stationary and supported on a suitable surface 43 when the plates are closed and travels through the chamber when the plates are separated. The filter media collects the solids of the prepared input slurry 44 when the filter is operated with the plates closed, and carries the collected filter cake out of the chamber when the plates are separated. Wash fluids, gases passing through the slurry and liquids separated from the slurry as filtrate pass through surface 43 and exit through filtrate exit port 44 attached to the lower plate 38, for conducting the liquids separated from the slurry to selected locations as will be described later.

The filter apparatus is controlled in its operations by the controller 16 which includes controls for the plate movement apparatus 46, such as hydraulically operated equipment employed in opening and closing the plates 36 and 38, and the filter media movement apparatus 48 for moving the filter media when the plates are separated. The controller 16 also controls the operation of input streams of several liquids or fluids here shown as liquid clearing or cake forming gas at 50, steam at 52, and drying or conditioning gas at 54. These and possibly other sources of input with suitable valves provide fluid or gas input to the filter chamber are passed into the chamber through a suitable valve means 56 and into input port 58 when the chamber is closed. It should be understood that one or more of different fluids or gases may serve as one or more of the liquid clearing or cake forming gas, steam or drying or conditioning gas. These inputs may be introduced by separate input ports like port 58.

When the plates are closed, the treated and conditioned slurry 33 (from FIG. 1) may be introduced into the chamber through a single input port 34 with suitable valving means 57 and distributed within the chamber.

Incorporated into this description are the details of the filter apparatus construction as shown and described in my prior U.S. Pat. Nos. 5,059,318, 5,292,434, 5,462,677, 5,477,891, 5,510,025, 5,573,667, 5,615,713, 6,159,359, 6,491,817 and 6,521,135; the disclosures of which are incorporated herein by reference. In certain of those patents multiple filter apparatus stacked above each other are disclosed as well as shallow chamber filter apparatus and slurry distribution apparatus that are used in accomplishing filtration of difficult to filter slurry streams.

An objective of the system and apparatus of the present invention is to treat slurries in a pressure filter for the separation of liquids and solids, the extraction of liquid as filtrate and creating a completely or substantially dry filter cake of solids. In some slurry treatment process it is the extraction of liquid or effluent that is desired and in others it is the filter cake that is desired. In either case it is the ability of the pressure filter and its operation that controls the production of the desired product. It is the conditioning of the slurry and the treatment of the slurry within the filter for formation of a cake within the filter that determines the success of the separation operation. The creation of the filter cake within the filter can be dependent on pretreatment operations on the slurry as well as distribution and operations within the pressure filter. The present invention is directed to those operations in treating a slurry stream and operations within the filter chamber to produce a desired result.

While many filtering operations are committed to known slurry streams, some slurry streams can vary in many aspects during ongoing filtering operations. As a first step used in the present system 10, a slurry stream 12 may be first passed through an analytical step in analytical equipment 14 for determining such characteristics of the slurry as its pH, temperature, pressure, viscosity and the like. While pre-analysis and process engineering may have established an original analysis the analysis in analysis equipment 14 can detect any changes in the slurry and those changes are supplied to the controller 16.

Based on the analysis of the slurry stream and the desired end product that is to be produced, the slurry stream is then subjected to a series of treatment processes all under the control of controller 16. One such process is the adjustment of the pH in pH adjuster 20 where a desired pH can be established by adding suitable chemicals.

A next possible treatment step is the addition of coagulants to the slurry stream from the coagulant source 22. Coagulants can be added to the slurry stream to selectively prepare certain portions of the slurry stream prior to entry into the filter chamber. The selection of a coagulant will be process selective and selected to accomplish a desired quality in the slurry stream. Coagulants are known for agglomerating or coagulating some elements of a slurry stream making separation of liquids and solids easier.

A next possible addition to the slurry stream is the addition of polymers that cause the slurry to be in a desired condition for filtration. In the process shown in FIG. 1, there are shown two sources of polymers; polymer A at 24 and polymer B at 26. Polymers added to a slurry stream can selectively collect certain materials in the slurry stream and hold or bond those materials in a form that will be more easily separated from the liquids of the stream.

Each of the treatment and additive possibilities may be under the control of the controller 16 that may have been preprogrammed to accomplish a desired condition for the slurry stream and/or may be capable of modifications based on input from the analytical equipment 14. Between each of the additive stages, inline mixers 27a, 27b, 27c, and 27d can be provided to assure that the treatment or additive has been adequately mixed into the slurry stream to accomplish the desired condition of the slurry stream. Mixing can also be accomplished with an arrangement of piping and piping equipment.

The use of coagulants and/or polymers can be effective in conditioning, treating or permeating the cake to be formed in the filtration chamber.

The treated slurry stream may be then fed to a slurry conditioning stage 28 in the form of a suitable hopper or container including a mixer 30 for establishing the desired mixing and conditioning of the slurry stream for transportation to the filter chamber of the filter apparatus 32 as shown in FIG. 2. The conditioning hopper or container 28 may be eliminated if the slurry stream is adequately mixed during additions and the slurry stream 33 may then be fed directly to the filter apparatus 32.

The filter apparatus 32 is described in my issued patents listed above and includes at least one pair of separable plates, upper plate 36 and lower plate 38 that have mating cavities for the formation of a filter chamber 40 when the plates are pressed and sealed against each other. The upper portion of the chamber 40 is adapted to accept input slurry at slurry input port 34 and to distribute the slurry uniformly within the chamber by means not shown here. The size of the chamber in volume is determined by the characteristics of the slurry being treated and is sometimes very shallow, ½ inch to 2 inch, to provide for uniform distribution or may be of greater vertical dimension, 6 to 8 inches, for slurries that are easily distributed. The distribution of the slurry within the chamber and the effect of even distribution will be described further hereinafter. Below the chamber 40 and above the lower plate 38, a filter media 42 is positioned for the collection of the solids from the slurry while the liquids are passed through the filter media and into the lower plate for discharge at port 44 from the filter apparatus 32. The filter media 42 is supported within the chamber by suitable means such as surface 43 and is sealed by the edges of the upper and lower plates as they are mated to form the chamber. The mating of the plates forming the chamber and the sealing of the filter media is at elevated pressure so that the interior of the chamber can be subjected to pressures as high as 400 psi when applicable. The plates and the filter media can be constructed of suitable material to be able to be subjected to high temperatures and pressures as applicable during the operation of the filter apparatus. Such material for the plates can be metal, elastomers or plastics that can withstand sustained exposure to the temperatures and pressures applied to the apparatus.

After the chamber has been formed and sealed and a controlled amount of slurry has been introduced into the formed chamber through valve 57 and properly distributed throughout the chamber, the interior of the chamber is subjected to a controlled series of introductions through a valve 56 and suitable input port 58. Even distribution of the slurry within the chamber is important to assure that any further treatment within the chamber is uniform and throughout the chamber. The input port 58 may be the same port as the slurry input port 34 with suitable isolating valving. The input port 58 carries liquid clearing or cake forming gas from the source 50, or steam from source 52, and drying or conditioning gas from source 54. The timing and duration of the input of these materials is under the control of controller 16 and in accord with a suitable program.

The introduction of gas, steam or conditioning gas is intended to extract the free liquids from the slurry as effluent or filtrate and the filter chamber is designed to pass those extracted fluids through the lower plate to the filtrate exit port 44. The extraction of liquids from the slurry forms a cake of solids within the chamber in a desired degree of dryness as the liquids are extracted as filtrate. To further treat the formed cake and to increase its dryness, an initial input of liquid clearing or cake forming gas which forces a first amount of the liquids from the slurry, that gas may be at ambient temperature or at elevated temperature in accord with an analysis of the slurry to be treated an in accord with the temperature that the slurry can withstand. The system is also adapted to introduce steam to the chamber to continue the extraction of liquids from the formed cake. Hot dry steam can absorb and extract liquids from the cake formed within the chamber and pass that extracted liquid to the exit port 44. The chamber can also have drying or conditioning gas 54 introduced through port 58 to continue the treatment of the cake prior to withdrawal from the chamber. Such drying or conditioning gas may also be used to control the temperature of the cake and/or the chamber to approach a desired exit temperature. The pressure of materials introduced to the chamber can be used to generate expanding gas or phase changes from liquid to gas from the cake as pressure is dropped and sudden pressure changes can be used to create desirable fissures in a formed cake as the gases expands. Each of the foregoing steps and introductions are under the control of the controller 16 in a preprogrammed and repeatable sequence. The liquids or gases that are passed through the exit port can be separated at the time they exit to be sent to any desired uses including recycle, product selection or disposal.

After the filtrate has been extracted and the cake has been treated to attain the desired dryness or condition, the chamber is opened and the filter media moving apparatus is operated to move the filter media belt out of the chamber for discharge of the cake to a suitable process conveyor or container. The filter media is then cleaned for reuse and prepared for reentry to the chamber or another segment of filter media is transported into the filter into alignment with the upper and lower plates. The filter apparatus may also use a disposable media as well as the cleanable filter media just described. The plates can then be closed again and the process of treating another input of slurry may begin. These cycles are continued in repeating cycles.

In accord with the present invention, a system and apparatus is disclosed for preparing a slurry for separation into filtrate and solids. It has been found that the introduction of flocculants, coagulants and polymers to a slurry can assist in the formation of a cake within the filter chamber that will permit more effective exposure of the cake to the introduction of wash liquids and other gases. This improvement in the formation of the filter cake materially assists in the extraction of liquids from the cake and the formation of a drier resultant filter cake. The coagulants assist in the formation of paths through the cake for the passage of liquids and gases in the extraction process. The polymers also assist in the formation of these extraction processes. The interior of the filter chamber may include sensing elements for determining the pressure, temperature and dryness of the formed and treated cake.

The introduction of gases, liquids and steam has been found to assist in the formation of a desired filter cake. The introduction of hot gas has been found to increase the efficiency of extraction of liquids from the cake. The hot gas can be heated from heat exchangers associated with the filter apparatus or from peripheral equipment in a manufacturing process, shown in FIG. 1 as heat recycle, thus improving the efficiency of the overall process. Heat created by recompressing of steam and gases may also be efficiently used.

The use of dry superheated steam has also been shown to assist in the extraction of liquids from a filter cake if the steam can be kept above its condensation point in the liquid/vapor condition of the steam. Steam while in its gas phase and above its condensation temperature or pressure will extract liquid from the cake. Because the filter chamber of the present filter apparatus can be maintained at elevated pressure and elevated temperature, the use of superheated steam can be used in the present system. Dry steam passing through a filter cake can absorb and extract liquids existing in the cake.

The temperature of the filter chamber can be varied during the filtration process to accomplish certain desired results. For example, when the filter cake is initially formed from the slurry, the introduction of steam may initially condense some liquid from the steam before the cake and/or chamber rises in temperature to be above the condensation temperature. That condensed liquid then assists in washing the cake and carrying liquids out as filtrate. When the temperature of the cake is above the condensation temperature, the steam then further dries the cake as it posses through the cake and absorbs moisture. After the use of high temperature steam, the chamber may need to be cooled before the cake is removed in preparation for the next filtration cycle. The introduction of drying or conditioning gas can be used for that purpose.

It should be understood that there will need to be suitable valving means at the filtrate exit port 44 to direct the desired filtrate from the chamber to its destination with wash fluids, gases, steam, and the desired filtrate directed under the control of the controller 16. If the desired product from the filtration process is a dry filter cake, the filtrate can be recycled or treated to other uses and the cake can be discharged to further processes. The fluids extracted from the slurry as filtrate may have several uses dependent upon the characteristics of the fluid being extracted. For example, the first extracted fluid may be used for one purpose while the later extracted fluid may have a different use. Extracted fluids may be used as fluid make-up in the slurry stream entering the apparatus of the present system.

Due to the lower temperature threshold for operations of the filter apparatus versus the temperatures incurred in conventional heated drying equipment, the produced filter coke exits from the filter apparatus substantially dry and cooler. The creation of volatile organic compounds (VOC) is reduced or possibly even eliminated because no further heat is required to dry the cake.

The methods for pretreatment of the slurry with coagulants or polymers is intended to prepare the slurry for the creation of an initial slurry formation that will expedite the extraction of liquids from the cake as it is formed. The pretreatment processes cause the cake to have more permeability and to have interstices that allow the passage of drying gases through the cake and thus assist in the creation of a drier filter cake. The reduction in time and the reduction of volume of treating liquids or gases increases the efficiency of the pressure filter and the economics of the system and apparatus. The elimination of peripheral equipment that have in the past been needed to further treat or dry a filter cake reduces the space requirements for a filter system and reduces the utility requirements for operation of the system. Whether it is the filtrate or the dried cake that is the product to be derived from the treatment of a slurry, the present system often produces such products in shorter time and with less operating costs than other known available systems. In some cases partial drying is economical in reducing drying costs and equipment when full drying is less feasible.

Figure 3:
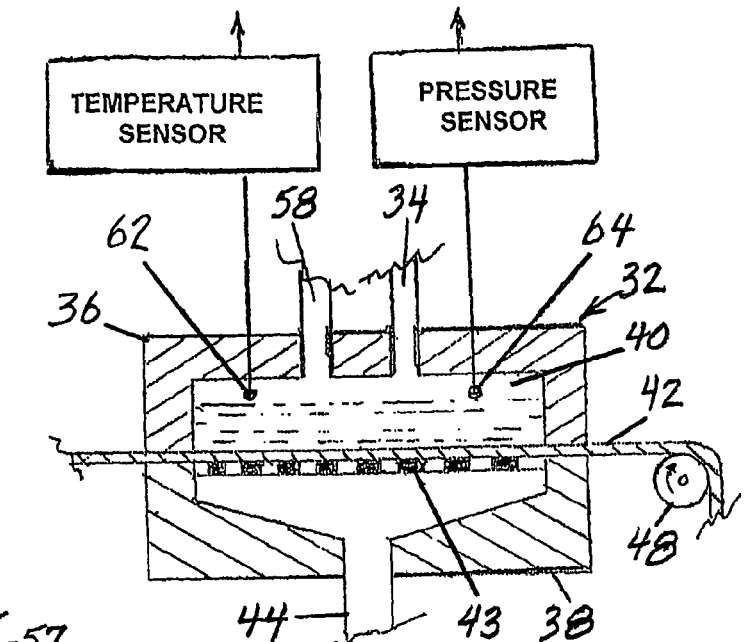
FIG. 3 illustrates the possible addition of temperature and pressure measurement apparatus associated with a filter chamber.

FIG. 3 illustrates a possible temperature measuring probe 62 and pressure measuring probe 64 associated with the interior of the chamber 40. It is also possible to derive temperature measurements from the exit ports of the filter and pressure can be measured at the input to the chamber.

Figure 4:
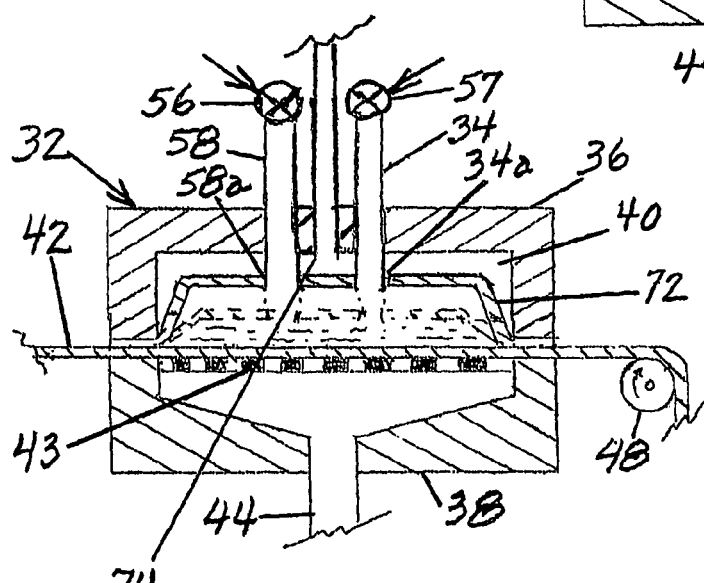
FIG. 4 illustrates the present invention arrangement for use with a filter chamber including a diaphragm for squeezing fluids from a slurry.

FIG. 4 illustrates the arrangement of the present system elements in a filter apparatus using a diaphragm 72 for pressing a slurry within a chamber. The diaphragm 72 can be provided with sealed entry port 58a for introduction of treated liquids and gases and an entry port 34a for introduction of slurry. Introduction of diaphragm operating pressure can be introduced through port 74 after the plates have been closed to form a chamber 40 and after slurry has been introduced through port 34a. The slurry can be treated with treating liquids before and after the diaphragm operation and any filter cake produced after diaphragm operations may be further treated with liquid clearing or cake forming gas, steam and drying or conditioning gas as described with respect to FIG. 2 to complete the extraction of liquids. After operation of the equipment, the chamber can be opened and the filter media can be moved to transport the filter cake from the apparatus.

Figure 5:
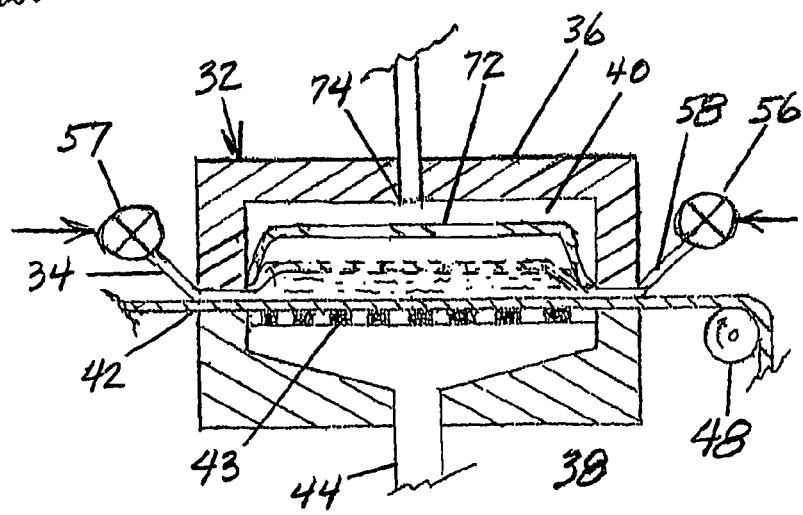
FIG. 5 is an alternative input system for a filter using a diaphragm.

FIG. 5 is an alternative form for introducing slurry and treatment fluids into a filter using a diaphragm to squeeze the slurry cake. I this form the port for introducing slurry, wash fluids and gases is under the diaphragm 72 and between the plates 36 and 38 and above the filter media 42. One or more input ports may be used such as port 58 and valve 56 for slurry input and port 34 and valve 57 for other influents.

While certain preferred embodiments of the invention have been specifically disclosed, it should be understood that the invention is not limited thereto as many variations will be readily apparent to those skilled in the art and invention is to be given its broadest possible interpretation within the terms of the following claims.

I claim:

1. A slurry filtration system for batch processing of a slurry to separate slurry liquids from slurry solids including in combination:
   a) a pressure filter apparatus comprising at least one upper plate with an internal cavity, at least one lower plate with an internal cavity, and a filter media, said upper and lower plates adapted to close and seal against each other mating said internal cavities to form a sealable pressurizable filtration chamber with said filter media between said sealed plates, means for opening and closing said filtration chamber by moving said plates with respect to each other, means for moving said filter media through the formed filtration chamber when said plates are open, means for introducing a batch of slurry, fluids and gases into said pressurized filtration chamber when said plates are closed, means for withdrawing fluids and gases from said chamber through said filter media and retaining slurry solids as a filter cake on said filter media within said internal cavities of said filtration chamber;
   b) a source of slurry to be filtered, means connecting said source of slurry to said means for introducing fluids into said filtration chamber and introducing a batch of said slurry to fill said filtration chamber;
   c) a plurality of means for performing pretreatment procedures on said slurry prior to introducing said slurry batch into said filtration chamber;
   d) means for analyzing characteristics of said slurry including at least temperature, pH and viscosity;
   e) means for sensing temperature and pressure within said filtration chamber when said plates are closed and when said slurry batch has been introduced;
   f) and a controller means for receiving information representing said analyzed characteristics and said sensed temperature and pressure, said controller including
      i) means for controlling said means for performing pretreatment procedures on said slurry,
      ii) means for controlling opening and closing of said plates,
      iii) means for moving said filter media;
      iv) and means for controlling said means for introducing fluids and gases and withdrawing fluids from said slurry batch as filtrate and forming a filter cake within said filtration chamber, and
   g) said plurality of means for performing pretreatment procedures on said slurry prior to introduction of said slurry batch into said filtration chamber additionally being controlled by said controller and comprising
      i) a source of heat for controlling said slurry temperature,
      ii) a source and means for adjusting said slurry in pH,
      iii) a source and means for introducing coagulant materials to said slurry,
      iv) at least one source and means for introducing polymer materials to said slurry, and
      v) at least one mixing means for mixing of said slurry and said sources during performing said pretreatment procedures to produce a treated and conditioned slurry for batch introduction into said filtration chamber, and
   h) whereby a batch of slurry can be analyzed, adjusted, mixed, introduced into said pressure filter apparatus and then efficiently separated into liquids and solids.

2. The slurry filtration system of claim 1 wherein said means for introducing fluids and gases for withdrawing fluids in said filtration chamber includes sources of gas and fluid connected to said pressure filter apparatus for introducing wash fluids, liquid clearing or cake forming gas, steam, or drying or conditioning gas for said chamber when said plates are closed.

3. The slurry filtration system of claim 2 wherein each of said sources for introducing fluids and gases are under control of said controller and each of said sources includes means for producing feedback information to said controller.

4. The slurry filtration system of claim 2 wherein said liquid clearing or cake forming fluid and gases sources includes controlled pressurized fluids for initially clearing free liquid from said slurry introduced, into said filtration chamber to form said filter cake of solids from said slurry and to force said free liquid out of said filtration chamber.

5. The slurry filtration system of claim 2 wherein said steam source includes a steam generator for producing dry superheated steam at a controlled pressure and temperature above the gas/liquid phase of said steam for introducing dry steam into said filtration chamber for extracting liquids from said slurry and for forming said filter cake in said filtration chamber.

6. The slurry filtration system of claim 2 wherein said source of drying or conditioning gas includes gas at a temperature and pressure for further drying of said filter cake and/or for controlling the temperature of said filter cake.

7. The slurry filtration system of claim 2 including means under control of said controller for venting said filtration chamber to reduce the pressure within said filtration chamber after said wash fluids, or liquid clearing or cake forming gas, steam, or drying or conditioning gas have been introduced into said filtration chamber.

8. The slurry filtration system of claim 1 including means within said filtration chamber for sensing characteristics of said formed filter cake within said filtration chamber.

9. The slurry filtration system of claim 1 wherein said filter plate moving means for opening and closing said plates causes release of pressure within said chamber when said plates are separated and to seal said plates when said plates are closed to form said sealable pressurizable filtration chamber to permit elevated pressure to be maintained within said filtration chamber.

10. The slurry filtration system of claim 1 including means for recycling heat from said sources for introducing fluids and gases including sources external to said heat source within said assembly.

11. The slurry filtration system of claim 1 including means for recycling slurry filtrate withdrawn fluids from said slurry from said filtration chamber to said source of slurry.

12. The slurry filtration system of claim 1 including mixing means associated with each of said means and sources for performing procedures for mixing said sources with said slurry stream.

13. The slurry filtration system of claim 1 wherein said source of coagulant materials includes materials for selectively binding solids suspended within said slurry to assist in formation of interstices in said filter cake formed in said filtration chamber.

14. The slurry filtration system of claim 1 wherein said source of polymer materials include materials for selectively binding solids suspended within said slurry to assist in selectively withdrawing fluids from said slurry as filtrate and forming a filter cake of retained slurry solids.

15. A method for operating a pressure filter apparatus system for separating liquids from solids in a slurry stream comprising the steps of:
   a) analyzing the pH, temperature and viscosity of said slurry,
   b) controlling the temperature, pH and viscosity of said slurry,
   c) pretreating said slurry by adding and mixing materials to said slurry to coagulate or flocculate solid materials in said slurry and to produce a treated slurry,
   d) introducing a portion of said slurry stream of treated slurry into a closed, sealed and pressurizable filtration chamber in a pressure filter system, said filtration chamber including a filter media and support porous means adapted to pass liquids of said slurry while retaining solids from said slurry on said filter media,
   e) after introducing said portion of said slurry stream, introducing slurry treating fluids and gases to said filtration chamber to pressurize said filtration chamber, said treating fluids and gases including wash fluids, liquid clearing or cake forming gases, steam, or drying or conditioning gas introduced to said chamber to initiate separation of liquids from said slurry and to form a filter cake of solids on said filter media,
   f) controlling said pressure within said filtration chamber to facilitate passage of said introduced fluids and gases through said filter cake,
   g) controlling the pressure within said filtration chamber to prepare for repeat venting or opening of said filtration chamber,
   h) opening said filtration chamber and moving said filter media to permit said filter media to carry said filter cake from said filtration chamber,
   i) closing said filtration chamber and repeating said steps of a) through h) for repeated processing of additional portions of said slurry stream,
   j) sensing temperature and pressure within said filtration chamber when said plates are closed and when an individual batch of said slurry has been introduced into said filtration chamber; and
   k) providing a controller for receiving information from each of said analyzing and sensing steps and for controlling each of said pretreating, pressure controlling, introducing, and filter media moving, opening and closing steps.

16. The method of claim 15 wherein said controller comprises preprogrammed operating procedures and feedback information for operating each of said controlling steps.

17. The method of claim 15 wherein said heating of said slurry stream is accomplished with recycle heat from within said filtration chamber, from recompression of gases or fluids used in said method, and/or from external sources associated with said filter system.

18. The method of claim 15 wherein said introduced steam is controlled in pressure and temperature to maintain said steam in a gas state within said filtration chamber for removing liquids from said formed cake, and then reducing the pressure or temperature of said steam to lower the temperature within said filtration chamber before said filtration chamber is opened.

19. The method of claim 15 wherein said filter filtration chamber of said filter system is controlled in temperature prior to the introduction of said slurry to permit treatment of said slurry for liquid separation without causing said formed cake to become damaged, then increasing said pressure to further withdraw liquids from said formed cake, then reducing said pressure to cause formation of fissures within said formed cake to permit removal of additional liquids from said formed cake under gas pressure.

20. The method of claim 15 with the addition of a diaphragm within said closed filtration chamber to contain said introduced slurry between said filter media and said support means, and means for compressing said diaphragm against said filter media to form said cake.

* * * * *